Patented Oct. 9, 1951

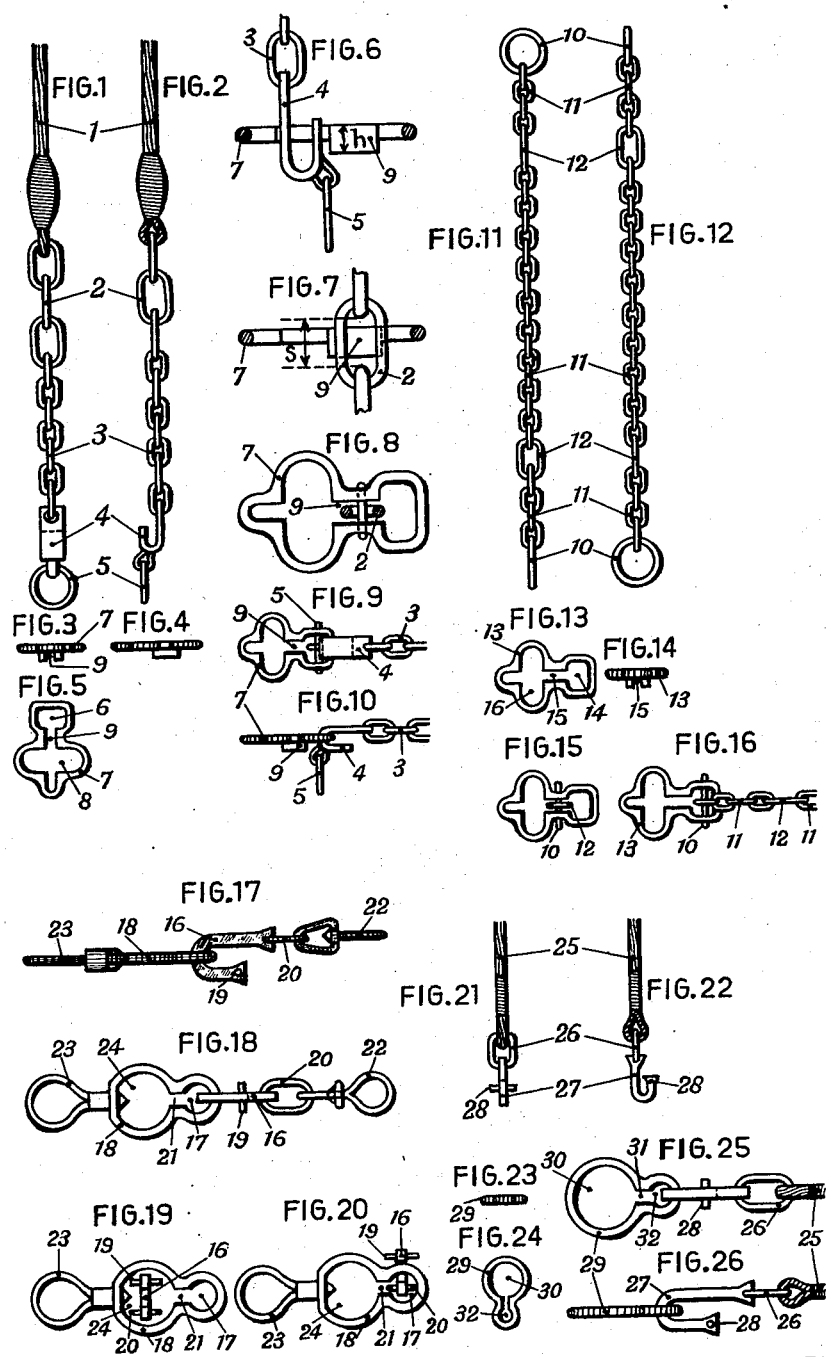

2,570,680

UNITED STATES PATENT OFFICE 2,570,680

SEPARABLE CHAIN FASTENER

Bouke Bontje Huizinga, Leeuwarden, Netherlands

Application January 24, 1947, Serial No. 723,975
In the Netherlands September 16, 1942

Section 1, Public Law 690, August 8, 1946
Patent expires September 16, 1962

7 Claims. (Cl. 24—225)

The invention refers to a safety fastening of easy manipulation in which one of the parts (the male portion) is connected to the other part (the female portion) by means of a hook or ring. These parts may be fitted to the extremities of chains, ropes, steel cables, or the like. However, the female portion of the fastening may also be permanently connected to a fixed object, such as a wall, post, etc., and in this case it will serve as a leach for horses, cows, sheep, etc. This fastening is not a safety fastening in the sense that an uninitiated person cannot open it, but it is designed in such a manner that the two parts cannot become disconnected by shaking, oscillation, or by other accidental movements, as is the case with ordinary fastenings with hook and eye.

According to the invention, the female portion of the fastening consists of a large and a small eyelet connected together by means of a slot, the dimensions of which are calculated in such a manner that only a member of corresponding dimensions in the male portion of the fastening can slide therein. This member which is intended to slide through the slot may, according to the invention, take the form of a chain link or ring.

Moreover, according to the invention, the male portion of the fastening may be constituted by a terminal hook of a chain and may be provided with a safety pin, this pin being able to pass through the large eyelet, but not the slot or the small eyelet of the female portion of the fastening. However, the chain contains one or more links of greater length which can penetrate and slide through the slot.

Finally, according to the invention, the male portion of the fastening may take the form of two rings connected together by a chain, these rings passing easily through the large eyelet, but not through the slot or through the small eyelet, while the chain which connects the two rings contains one or more elongated links which may be pushed through the slot.

The annexed sheet of drawings shows, by way of example, four methods of performing the invention. Figures 1–10 show the first method, Figures 11–16 the second, Figures 17–20 the third, and Figures 21–26 the fourth method of performance.

Figure 1 represents the male portion of the fastening in a front elevation of the first method of performance. Figure 2 is a side view corresponding thereto. Figures 3, 4 and 5 represent respectively a front view, side view and plan of the corresponding female portion. Figures 6, 7 and 8 show (on an enlarged scale) certain positions in the coupling movement of the two portions, Figure 8 being a plan view of Figure 7. Figures 9 and 10 show respectively in plan and elevation the coupled fastening. Figure 11 is an elevation of the male portion according to the second method of performance, Figure 12 being the corresponding side view. Figures 13 and 14 are respectively plan and edge views of the other female portion, and Figures 15 and 16 show in plan two positions in the coupling movement of this second method of performance. Figure 17 is a section of the fastening connected up according to the third method of performance, and Figure 18 is a corresponding plan. Figures 19 and 20 show in plan two positions in the coupling movement. Figure 21 is a front elevation of the male portion in the fourth method of performance, and Figure 22 is the corresponding side view. Figures 23 and 24 are a front elevation and plan of the female portion of the fastening. Figures 25 and 26 show, on an enlarged scale, the coupled fastening in plan and in profile.

*Method of performance I.*—The rope 1 is connected by means of three long chain links 2 and few shorter chain links 3 to the male portion of the fastening which takes the form of a hook 4 from which is suspended the safety ring 5. The hook 4 engages when the fastening is coupled, in the small eyelet 6 of the female portion 7, as is represented in Figures 9 and 10. The hook 4 cannot be disengaged from the eyelet 6 as it is prevented by the safety ring 5 suspended from this hook. The hook and ring can pass through the large eyelet 8 of the female portion of the fastening and when this operation has been performed, the portion of the chain constituted by the short links 3 is allowed to run through the eyelet 8 until one of the long links 2 comes in front of the slot 9. This slot is of a certain height $h$ (Figure 6) which is less than the distance $s$ between two alternate links (Figure 7). By reason of the fact that the distance corresponding to $s$ between the short links is less than the distance between alternate long links, these long links can pass through the slot 9 (Figures 7 and 8) while the short links cannot do so. Now when a long link 2 is pushed from the large eyelet 8 into the small eyelet 6, that part of the chain which has been lowered can be raised again until the hook 4 engages the edge of the eyelet 6 and the coupling is thus effected. To release the coupling, the operation is performed in reverse.

*Method of performance II.*—Two rings 10 are connected by a chain composed of short links 11 in which are incorporated one or more long links 12, the whole forming the male portion of the fastening, while the female portion 13 is as shown in Figure 13. The rings 10 cannot pass through the eyelet 14 or through the slot 15 of the female portion 13, but they can, on the other hand, slide through the eyelet 16 of this portion 13. If it is desired to effect the coupling, the chain is lowered through the eyelet 16 of the portion 13 of the fastening, until one of the long links 12 is brought in front of the slot 15. Then this link is moved until it reaches the eyelet 14 (Figure 15). The lowered portion of the chain can now be raised until the ring 10 comes against the eyelet 14 (Figure 16). To release the coupling, the operation is carried out in reverse.

*Method of performance III.*—The hook 16 (Figure 17) is adapted to engage as the male portion of the fastening, in the eyelet 17 of the female portion 18. The hook is provided with a safety pin 19 which cannot pass through the eyelet 17. The hook 16 is connected to the swivel ring 22 by means of the chain link 20, this latter being the only part which can slide through the slot 21 of the female portion; moreover, the member 18 is provided with a swiveling ring 23. To effect the coupling, the hook of the male portion is lowered through the eyelet 24 of the female portion (Figure 19) until the link 20 comes in front of the slot 21. This link 20 is thus pushed through the slot 21 so that it enters the eyelet 17 (Figure 20), after which it only remains for the male portion of the fastening to be pulled up and the hook 16 to be engaged with the outer edge of the eyelet 17. To release the fastening, the operation is performed in reverse.

*Method of performance IV.*—In this method of performance, the male portion of the fastening takes the form of a rope 25 (Figures 21 to 26) connected by means of a link 26 to a hook 27 provided with a safety pin 28. The female portion of the fastening is constituted by a member 29, provided with a large eyelet 30 which communicates by a slot 31 with a smaller eyelet 32. The link 26 is the only member capable of entering the slot 31. To make the connection, the hook 27 is passed through the eyelet 30 to bring the link 26 in front of the slot 31. This link 26 is then pushed through the slot 31 until it reaches the small eyelet 32, after which the hook is engaged with the edge of this small eyelet (Figures 25 and 26). To release the fastening, the operation is reversed.

What is claimed is:

1. A fastener comprising a male portion and a female portion, said female portion comprising a large eyelet, a small eyelet, and a bridge with side walls of predetermined height having a slot between said side walls for interconnecting said eyelets, said slot being of a width smaller than the diameter of either of the openings in said eyelets, said male portion comprising a member adapted to abuttingly engage said small eyelet when said portions are in a fastened state, a link connected to said member, said link only being adapted to pass through said slot, and an element of larger dimensions than said slot connected to said member.

2. A fastener comprising a male portion and a female portion, said male portion comprising a member of predetermined dimensions, at least one short link connected to said member, and at least one long link connected to said short link, said female portion being constituted by a large eyelet and a small eyelet with a slot interconnecting said openings, side walls adjacent said slot of a predetermined height, whereby said long link only is adapted to pass transversely through said slot, said male portion being locked to said female portion by longitudinally passing said member and short link entirely through and said long link midway through said large eyelet, passing the long link transversely through the slot and into the small eyelet and then drawing the links and member in a reverse, longitudinal direction through the small eyelet until the member is in abutting engagement at the small eyelet with the female portion.

3. A fastener according to claim 2, in which the member is constituted by a hook that is adapted to engage the walls of the small eyelet.

4. A fastener comprising a male portion and a female portion, said female portion comprising a large eyelet, a small eyelet, and a bridge with side walls of predetermined height having a slot between said side walls for interconnecting said eyelets, said slot being of a width smaller than the diameter of either of the openings in said eyelets, said male portion comprising a ring of larger diameter than the small eyelet and of smaller diameter than the large eyelet, said ring being adapted to pass through said large eyelet, at least one short link connected to said ring, the height of said bridge being greater than said short link, so as to prevent passage of said link through said slot, and at least one long link connected to said short link, said long link being longer than the height of said bridge and thus adapted for passage through said slot.

5. A fastener comprising a male portion and a female portion, said female portion comprising a large eyelet, a small eyelet, and a bridge with side walls of predetermined height having a slot between said side walls for interconnecting said eyelets, said slot being of a width smaller than the diameter of either of the openings in said eyelets, said male portion comprising a hook of greater dimensions than the small eyelet and of smaller dimensions than the large eyelet, said hook being adapted to pass through said large eyelet, at least one short link connected to said hook, the height of said bridge being greater than said short link, so as to prevent passage of said link through said slot, and at least one long link connected to said short link, said long link being longer than the height of said bridge and thus adapted for passage through said slot.

6. A fastener comprising a male portion and a female portion, said female portion comprising a large eyelet, a small eyelet, and a bridge with side walls having a slot between said side walls for interconnecting the eyelets, said slot being of a width smaller than the diameter of the openings in said eyelets, said male portion comprising a hook for connection to said small eyelet, a pin extending transversely from each side of a free end of the hook, said pins being of greater overall length than the opening in the small eyelet, and a link connected to the other end of the hook, said link being adapted to pass through said slot.

7. A fastener comprising a male portion and a female portion, said female portion comprising a large eyelet, a small eyelet, and a bridge with side walls of predetermined height having a slot between said side walls for interconnecting said eyelets, said slot being of a width smaller than the diameter of either of the openings in said eyelets, said male portion comprising a member for abutting engagement with said small eyelet, an element connected to said member, and a link longer than the height of said bridge connected to said member, said link only being adapted to pass through said slot.

BOUKE BONTJE HUIZINGA.

REFERENCES CITED

The following references are of record in the file of this patent:

UNITED STATES PATENTS

| Number | Name | Date |
| --- | --- | --- |
| 98,169 | Lenox | Dec. 21, 1869 |
| 197,176 | Richardson | Nov. 13, 1877 |
| 761,988 | Oldach | June 7, 1904 |
| 1,611,596 | Larsson | Dec. 21, 1926 |